Sept. 8, 1953 C. B. DALE 2,651,523

ADAPTER FOR PHONOGRAPH RECORDS

Filed Feb. 28, 1951

INVENTOR.
Colin B. Dale
BY Banning & Banning
Attys.

Patented Sept. 8, 1953 2,651,523

UNITED STATES PATENT OFFICE 2,651,523

ADAPTER FOR PHONOGRAPH RECORDS

Colin B. Dale, Oak Park, Ill., assignor to Webster-Chicago Corporation, Chicago, Ill., a corporation of Illinois Application February 28, 1951, Serial No. 213,163

1 Claim. (Cl. 274—10)

Manufacturers of phonographs have been confronted in recent years with new problems arising from the production of disc records having different diameters some of which are playable at special speeds which are different from that of the others. To provide automatic record changers in connection with such phonographs has proved an even greater problem. In recent time certain records with oversize center holes (about 1½" diameter) have also been introduced upon the market, adapted for play only by phonographs having turntables with relatively large center spindles of substantially corresponding diameter. It is not possible to play such records upon a phonograph which is equipped with the heretofore standard turntable spindle of relatively small diameter (about $\frac{9}{32}$" diameter) designed for use with a very large proportion of the records as made in the past. Such a condition is both costly and unsatisfactory for the owners of standard phonographs who may wish to play thereon the newer records which have oversize center holes.

At present the records which have oversize center holes may be played on the conventional phonograph, but only if adapters therefor be provided with center holes corresponding in size to those of ordinary spindles. Such an insert must be installed fixedly in place to assure concentricity of the record when placed upon the turntable. Furthermore, the operation of installing any such insert involves some effort as does also its removal. Each such operation is usually damaging to the record hole so that, in time, the record may be rendered unfit for further use. Also the owner of an extensive library of records will have to be equipped with many such inserts, involving a substantial outlay and considerable effort in their installation. These are some of the shortcomings of the attempted solution of the problem with which I am here concerned.

According to the present invention, no insert is needed to adapt a record having an oversize center hole for play upon a phonograph which is equipped with the conventional spindle of relatively small diameter. Provision is also made, as will shortly appear, for adapting the existing record changing mechanism of a conventional phonograph having the usual small diameter spindle to operate with records having oversize holes. This is accomplished by providing an adapter of two units each of which may be loosely placed in its operative position and be removed therefrom without any effort whatsoever. One of these units rests upon the turntable in surrounding relation to the spindle, and the other unit is fitted over the pilot at the spindle top to rest upon a shoulder that is offset therefrom to provide support for a stack of records in reserve. These two units coact with a standard form of record changing mechanism to (1) position the reserve records operatively with respect thereto, and (2) guide each released record to a playing position which is concentric with the axis of the turntable.

A simple form of two-unit adapter embodying the features of this invention is illustrated in the accompanying drawing in the manner following:

Figures 1, 2, 3, 4:
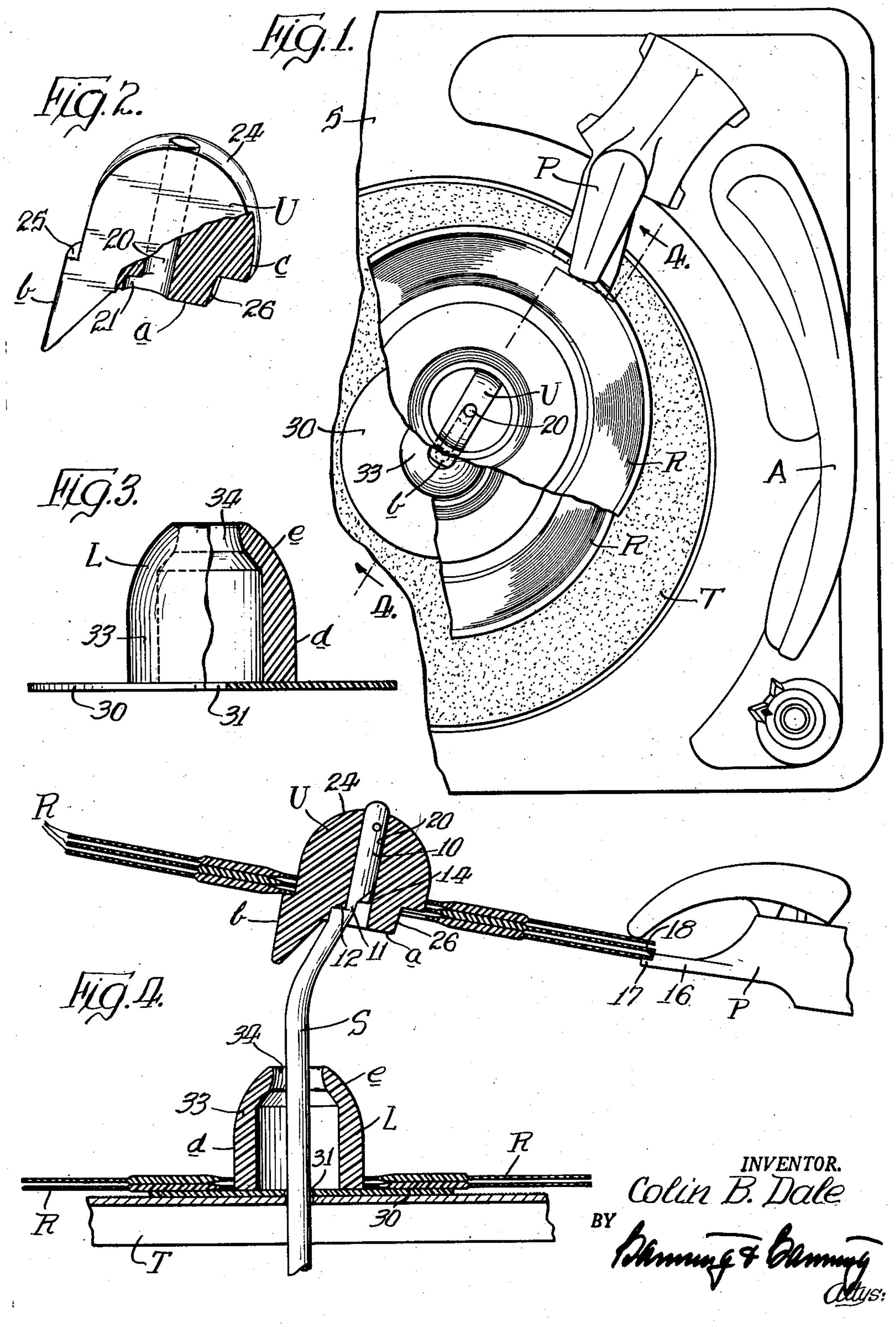
Figure 1 is a fragmentary plan view of a phonograph turntable whereon is placed the lower adapter unit to hold a record in playing position, a reserve record being also shown as supported upon the upper adapter unit at an elevation well above the turntable.
Fig. 2 is a perspective view of the upper adapter unit designed for fitting over the pilot at the upper end of the spindle.

Fig. 3 is a side elevation of the lower adapter unit that is rested upon the turntable, a portion of the view being broken away to exhibit a portion thereof in vertical section; and Fig. 4 is a view in vertical section of a turntable whereon two records are supported in concentricity therewith by the lower adapter unit, the spindle which rises axially from the turntable being shown in elevation and mounting the upper adapter unit which is fitted over the pilot and rested upon the shoulder that is offset with respect thereto.

The phonograph here shown comprises a base plate 5 over which is extended the usual tone arm A one end of which is mounted on a post (not shown) with capacity to swing to playing position with respect to a record R that is carried upon the turntable T. There is also shown as rising from the base at one side of the turntable a marginal support for the records in reserve. In the form shown this is a push-off device P which is mounted for movement radially of the turntable through which is vertically extended an axial spindle S whose lower end (not shown) is non-rotatably secured in place. The operating mechanism for the phonograph which is carried on the underside of the base requires no disclosure for an understanding of this invention.

The spindle here shown is of the type which is provided in its upper end portion with an offset pilot 10 rising from a narrow neck 11 which joins with an offset shoulder 12 therebelow. It is unimportant whether the spindle be straight up to the level of its shoulder or be formed with an inclination, as shown, whereby the pilot is positioned eccentrically of the turntable and with its axis anugularly of the spindle axis. Both types of spindles are common at the present time. The diameter of such a spindle and its pilot is relatively small, perhaps about $\frac{9}{32}''$. This diameter is chosen with reference to that of the center holes which have commonly been provided in disc records of the past and present.

When one or more records are fitted over the pilot, the shoulder 12 will afford a rest for the lowermost record R to prevent its further descent along the spindle unless the record be first shifted laterally toward the free edge of the shoulder. When so shifted, the lowermost record is freed from supporting engagement with the shoulder so as to descend by gravity along the spindle to playing position upon the turntable. Means in the form of a vertically sliding block 14 are also carried by the pilot, within an endwise slot therein, for preventing lateral shifting movement of any record in the reserve stack except the one which is lowermost, thereby to assure a release of but one record at a time. Successive records which are to be dropped on to the turntable will form a stack thereon, the one which is uppermost being in playing position relative to the transducer of the tone arm.

The push-off device P is also conventional in that it may be formed with a rotatable head having one or more shelves 16 provided with a lip 17 which projects therefrom. Each shoulder 18 which rises from a lip on one side of the head is positioned away from the pilot 10 a distance which corresponds to the radial dimension of the record which is to be supportingly engaged thereby. The lip underlies the edge of the lowermost record when supported on the spindle shoulder 12 and steadies the records in reserve at the point of engagement therewith. When the pusher is advanced radially toward the spindle, one of the shoulders 18 (the one then engaging the periphery of the lowermost reserve) will shift the record laterally to displace it from the spindle shoulder 12. It will thereupon be released for gravity descent along the spindle to playing position upon the turntable. Mechanisms for producing such an operation have heretofore been known but form no part of this invention.

The adapter which is special to this invention consists of two coacting units U and L which occupy upper and lower positions respectively upon the spindle. The upper unit is in the form of a supporting head that is relatively narrow in one direction and long in the direction that is normal thereto. The head is vertically apertured at 20 to receive the spindle pilot 10 when fitted thereupon, and on its underface *a* is formed with a recess 21 extending laterally from the aperture to accommodate the spindle shoulder 12 but only when the long dimension of the head is substantially aligned radially toward the push-off device P. The provision of this recess, in conjunction with the offset shoulder 12, serves to maintain the head fixedly in the rotative position just described.

The head top is rounded at 24 from end to end, i. e. lengthwise of its long dimension which is very slightly less than the oversize holes of the records to be accommodated thereon so as to be freely receivable therein. Upon its narrow face *b* which is remote from the record marginal support the head is outset to provide a shoulder 25 disposed normally of the axis of the aperture 20. A stack of reserve records R may be rested on this shoulder to be supported thereupon. The lowermost of these reserve records is also marginally supported at one point, viz. where it is engaged by the shelf 16 of the push-off device P. The head face *c* proximate to this shelf is formed with an inset 26 which extends upwardly from its bottom face *a* to a point above the shoulder 25 by a distance approximately equal to the thickness of one record R. Such an arrangement permits the lowermost reserve record to be shifted laterally toward the inset face 26, when the push-off device is operated, while restraining other reserve records thereabove and supported thereby from executing a like movement. By the means described, viz. the upper adapter unit U with its special features of construction just explained. I provide for (1) supporting upon the pilot of a relatively small diameter spindle a supply of reserve records each having an oversize center hole, and (2) releasing such records, one at a time, for gravity descent along the spindle to a playing position which is coaxial therewith.

The lower adapter unit L is a centering medium to assure retention of each record, when in playing position, in concentricity with the turntable. Such a centering unit comprises a base 30 in the form of a thin circular disc having a center hole 31 of a size to freely receive the small diameter spindle and be maintained coaxial therewith when rested upon the turntable T. Affixed to this base coaxially thereof is a circular element here shown as a cylindrical dome 33 whose sides at *d* rise straight from the base and then incline inwardly at *e* in the upper region to leave at the top an opening 34. The outside diameter of the dome walls at *d* is very slightly less than is the diameter of the oversize holes in the records R to be accommodated thereon. As indicated clearly in Fig. 4, records, as released one at a time from the supporting adapter unit U, will descend by gravity along the spindle S to to be guided by the curved dome walls to a position of rest upon the base disc 30 (or upon the topmost record that is then resting thereupon). When so disposed, the record last released will be held in the correct playing position concentrically with respect to the turntable so as to be rotated thereby.

The top opening 34 in the lower adapter unit is sufficiently large to pass over the offset shoulder 12 when moved along the spindle to or from playing position. It is necessary that the size of the base hole 31 conform substantially with that of the spindle itself so as to assure coaxiality of the centering unit when in operative position. In moving the unit axially of the spindle, a lateral shift will be required for the base 30 to pass the shoulder 12. There will also be involved some tilting of the unit limited, however, by engagement of the dome walls 33 at the point where the top opening 34 is defined. According to the present invention, sufficient clearance is provided around this top opening to permit tilting the centering unit through the distance necessary for its movement axially of the spindle past the shoulder, either way, even though the spindle be of the type herein illustrated with the pilot at its upper end inclined angularly with respect to the axis of the turntable.

The two-unit adapter of this invention may be produced inexpensively and attractively from a suitable plastic material. Each unit may be readily applied to or removed from the phonograph spindle. But one such adapter is required for an entire library of records having oversize holes. The records themselves remain untouched and unharmed and may then be played upon a phonograph whose turntable spindle is of substantially the same oversize diameter.

I claim:

For use with a phonograph having a rotatable turntable and coaxially thereof an upstanding non-rotatable spindle of relatively small diameter provided intermediate its ends at one side thereof with a shoulder to support a stack of records with center holes of small diameter corresponding with that of the spindle, the lowermost record being laterally shiftable off the shoulder to drop towards the turntable; a removable adapter for receiving and centering, with respect to the spindle, a stack of records having relatively large diameter center holes, said adapter having a center aperture to receive the spindle, an alignment aperture to engage said spindle shoulder, and a shoulder substantially in alignment with the spindle shoulder to support the stack of records having large holes the lowermost of which may be laterally shifted off the shoulder to drop toward the turntable.

COLIN B. DALE.

References Cited in the file of this patent

UNITED STATES PATENTS

| Number | Name | Date |
|---|---|---|
| 874,985 | O'Neill | Dec. 31, 1907 |
| 1,471,092 | Blaha | Oct. 16, 1923 |
| 1,568,130 | Blackwell | Jan. 5, 1926 |
| 2,554,919 | Mullaney | May 29, 1951 |